United States Patent [19]
Kurata et al.

[11] Patent Number: 5,299,056
[45] Date of Patent: Mar. 29, 1994

[54] OPTICAL PASSIVE COMPONENT ASSEMBLY

[75] Inventors: Noboru Kurata, Ikoma; Hironori Souda, Hirakata; Masaaki Tojo, Nara, all of Japan

[73] Assignee: Matsushita Electric Industrial Co., Ltd., Osaka, Japan

[21] Appl. No.: 56,535

[22] Filed: May 5, 1993

[30] Foreign Application Priority Data

May 6, 1992 [JP] Japan .................. 4-113440
Jul. 8, 1992 [JP] Japan .................. 4-180842

[51] Int. Cl.⁵ .................................. G11B 7/00
[52] U.S. Cl. ............................ 359/341; 359/629; 359/639
[58] Field of Search ........... 359/618, 629, 638, 639, 359/640, 341

[56] References Cited

U.S. PATENT DOCUMENTS

| | | | |
|---|---|---|---|
| 3,609,381 | 9/1971 | Hartfield | 250/225 |
| 4,694,447 | 9/1987 | Cohen et al. | 350/174 |
| 4,770,505 | 9/1988 | Okazaki . | |
| 5,044,713 | 9/1991 | Mozer et al. . | |

FOREIGN PATENT DOCUMENTS

| | | |
|---|---|---|
| 58-48019 | 3/1983 | Japan . |
| 59-28116 | 2/1984 | Japan . |
| 1-155228 | 6/1989 | Japan . |
| 2-309328 | 12/1990 | Japan . |
| 2-311829 | 12/1990 | Japan . |
| 4-104216 | 4/1992 | Japan . |
| 4-104218 | 4/1992 | Japan . |

OTHER PUBLICATIONS

Technical Report entitled "Er-Doped Optical Fiber Amplifier", issued from Japanese Society of Electronic Data Communication (QQE92-71) with partial English translation.
"Integrated Optical Module for Er-doped Fiber Amplifiers" in Spring Meeting of Japanese Society of Electronic Data Communication in 1992 (C-262).
"A polarization coupler with a WDM filter and a polarization independent optical isolator" in Spring Meeting of Japanese Society of Electronic Data Communication in 1991 (B-964).
"Optical Surface Mount Device" in Spring Meeting of Japanese Society of Electronic Data Communication in 1991 (C-263).
"Integrated Optical Device with WDM, PBS and Isolator", in Spring Meeting of Japanese Society of Electronic Data Communication in 1991 (C-264).

Primary Examiner—Mark Hellner
Attorney, Agent, or Firm—Wenderoth, Lind & Ponack

[57] ABSTRACT

An optical fiber amplifier suited for use in optical fiber transmission systems includes a plurality of optical passive components. The optical passive components are integrated into an assembly including a birefringent crystal, a first lens, a magneto-optic crystal, an optical filter, and a second lens, all of which are axially aligned in this order, with a half-wave plate interposed between the birefringent crystal and the first lens. The birefringent crystal is opposed to end faces of first and second optical fibers and separates incident light into two linearly polarized light beams having respective polarized light planes generally perpendicular to each other. The half-wave plate allows light emitted from the second optical fiber to pass therethrough and rotates a polarized light plane of incident light. The first lens converts incident light into a generally collimated ray, and the magneto-optic crystal rotates a polarized light plane of incident light by an angle of $\pi/8 + Nn/4$ ($N=0, 1, 2, ...$) under the influence of a magnetic field. The optical filter reflects light having a specific wavelength and allows light having a wavelength other than this specific wavelength to pass therethrough, and the second lens are opposed to end faces of third and fourth optical fibers and converges a collimated ray introduced thereinto. By this construction, an optical coupling system is constituted between the first and second optical fibers and between the third and fourth optical fibers and one of the first and second optical fibers.

16 Claims, 3 Drawing Sheets

OPTICAL PASSIVE COMPONENT ASSEMBLY

BACKGROUND OF THE INVENTION

1. Field of the Invention

The present invention relates generally to an optical fiber amplifier for use in optical fiber transmission systems, and more particularly to an optical passive component assembly constituting part of the optical fiber amplifier.

2. Description of the Prior Art

In optical fiber transmission systems, an optical fiber amplifier employing an erbium-doped optical fiber or fibers has widely been used wherein a plurality of optical passive components such as, for example, a polarized light coupler, an optical wavelength coupler (multiplexer), and a polarization-independent optical isolator are integrated. The polarized light coupler polarizes and couples two laser beams each having a wavelength of 1.48 μm and emitted from two optically pumping laser diodes (semiconductor lasers), respectively, to obtain a doubled optical output. The optical wavelength coupler makes pumping light enter the erbium-doped optical fiber and takes out light having a wavelength of 1.55 μm amplified by the erbium-doped optical fiber using an optical fiber. The polarization-independent optical isolator allows signal light to pass therethrough only in one direction, thereby preventing the amplified light from traveling in the reverse direction and entering the erbium-doped optical fiber again.

Each of these optical passive components generally includes at least two opposed lenses, two optical fibers disposed on opposite sides of the two opposed lenses, and various optical elements interposed therebetween. In applications where a plurality of optical passive components are integrated in an optical fiber amplifier, because the optical fiber amplifier requires a number of lenses, the size thereof becomes large and the manufacturing cost thereof becomes high. Furthermore, because optical fibers of one component are fused and connected to those of another, not only the optical loss is increased due to such connection, but also a variation in optical loss occurs. In addition, because each of conventional optical fiber amplifiers generally require space to fasten a number of optical passive components and space to place the mutually connected optical fibers, the amplifier body tends to become bulky.

SUMMARY OF THE INVENTION

The present invention has been developed to overcome the above-described disadvantages.

It is accordingly an object of the present invention to provide a compact optical passive component assembly having a reduced number of optical elements, wherein the adjustment of optical axes thereof can be readily carried out.

Another object of the present invention is to provide a compact optical fiber amplifier employing an optical passive component assembly of the above-described type.

In accomplishing the above and other objects, an optical passive component assembly according to the present invention includes first and second convergent rodlenses axially aligned with each other in end-to-end fashion, a first fiber group placed so as to confront one end of the first convergent rodlens remote from the second convergent rodlens, and a second fiber group placed so as to confront one end of the second convergent rodlens remote from the first convergent rodlens. The first fiber group includes first and second optical fibers, whereas the second fiber group includes third and fourth optical fibers. A birefringent crystal is interposed between the first fiber group and the first convergent rodlens, and a half-wave plate, through which light emitted from the second optical fiber passes, is interposed between the birefringent crystal and the first convergent rodlens. Furthermore, a magneto-optic crystal is interposed between the two convergent rodlenses, and an optical filter is interposed between the magneto-optic crystal and the second convergent rodlens.

Signal light having a wavelength of 1.55 μm and emitted from the first optical fiber is separated into two linearly polarized light beams having respective polarized light planes generally perpendicular to each other by the birefringent crystal. These linearly polarized light beams are converted into collimated rays, respectively, by the first convergent rodlens, and the polarized light planes thereof are rotated, for example, counterclockwise by 22.5° by the magneto-optic crystal. The two collimated and linearly polarized light beams are then reflected by the optical filter, and the polarized light planes thereof are rotated again by the magneto-optic crystal by 22.5° in the same direction. These light beams are further rotated by the half-wave plate by 45° in the same direction, and are subsequently polarized and combined by the birefringent crystal so as to be introduced into the second optical fiber. The above-described operation corresponds to the function of a polarization-independent optical isolator.

Optically pumping light beams each having a wavelength of 1.48 μm and emitted from the third and fourth optical fibers, respectively, are initially converted into collimated rays by the second convergent rodlens and subsequently pass through the optical filter, the magneto-optic crystal, and the first convergent rodlens. These collimated rays are then polarized and combined by the birefringent crystal and are introduced into the first optical fiber. The above-described operation corresponds to the function of an optical wavelength coupler and that of a polarized light coupler.

Because the functions of the polarization-independent optical isolator, the optical wavelength coupler, and the polarized light coupler, all required for an optical fiber amplifier, are integrated, the assembly according to the present invention is free from the optical loss, which has hitherto been caused by fusing and mutually connecting ends of optical fibers.

Furthermore, both of the birefringent crystal and the magneto-optic crystal act on the signal light twice, and the birefringent crystal also contributes to polarized light coupling of the optically pumping light beams. Accordingly, the number of optical elements can be reduced to about half of that used in conventional optical passive component assemblies, thereby realizing an inexpensive and compact optical passive component assembly.

In addition, because the two optical fibers of the first fiber group and those of the second fiber group are oriented in the same direction with respect to the first and second convergent rodlenses, respectively, the two optical fibers of each of the first and second fiber groups can be readily bundled by a fiber holder. Accordingly, optical coupling can be readily carried out by adjusting the position of the fiber holder relative to the associated convergent rodlens.

For these reasons, the assembly according to the present invention greatly contributes to miniaturization of an optical fiber amplifier and can reduce the manufacturing cost thereof.

It is to be noted that although the optical elements constituting the assembly of the above-described construction are aligned substantially straight, the optical axis thereof may be bent by incorporating a half mirror and/or a reflector thereinto.

BRIEF DESCRIPTION OF THE DRAWINGS

The above and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
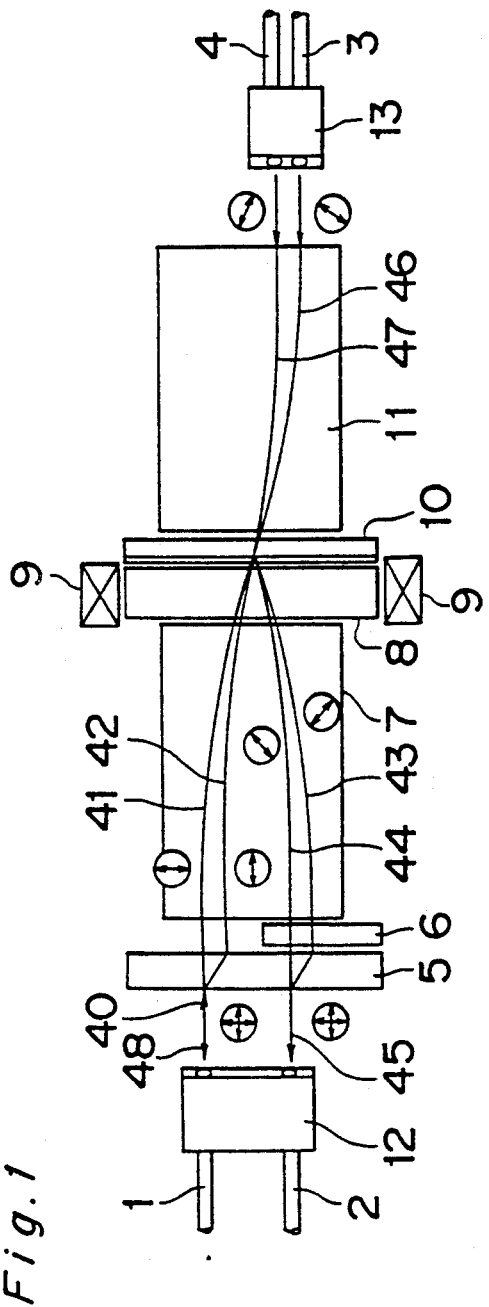
FIG. 1 is a schematic view of an optical passive component assembly according to a first embodiment of the present invention.

Referring now to the drawings, there is schematically shown in FIG. 1 an optical passive component assembly according to a first embodiment of the present invention.

The assembly according to the present invention includes a birefringent crystal or birefringent medium 5, a first grin or convergent rodlens 7, a magneto-optic crystal 8, an optical filter 10, and a second grin or convergent rodlens 11, all of which are axially aligned in this order. A half-wave plate 6 is interposed between the birefringent crystal 5 and the first grin rodlens 7 and is off-centered therefrom. Two single-mode optical fibers 1 and 2 are disposed on the left side of the birefringent crystal 5, whereas two polarization-maintaining optical fibers 3 and 4 wherein a polarized light plane is maintained unchanged are disposed on the right side of the second grin rodlens 11.

The birefringent crystal 5 is made of, for example, a rutile crystal for separating incident light into two linearly polarized light beams having respective polarized light planes generally perpendicular to each other. The first grin rodlens 7 converts incident light into collimated light. The half-wave plate 6 is made of a rotational crystal for reversibly rotating a polarized light plane of incident light by 45°. The magneto-optic crystal 8 is encircled by a cylindrical magnet 9 and nonreversibly rotates a polarized light plane of incident light counterclockwise by 22.5° under the influence of a magnetic field produced by the magnet 9. The optical filter 10 allows light having a wavelength of 1.48 $\mu$m to pass therethrough and reflects light having a wavelength of 1.55 $\mu$m. The second grin rodlens 11 converges collimated incident light to a location in the proximity of an output end face thereof.

Figure 2:
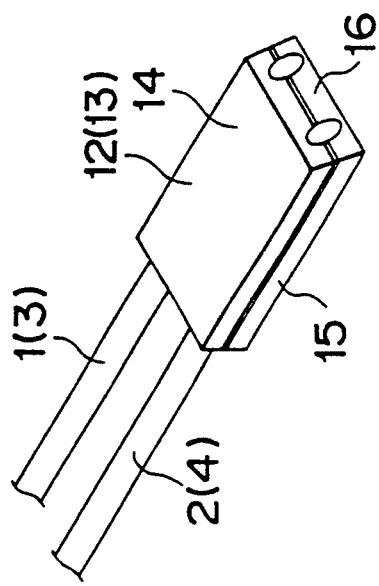
FIG. 2 is a perspective view of a fiber holder employed in the assembly of FIG. 1.

As best shown in FIG. 2, the two optical fibers 1 and 2 are bundled by a fiber holder 12 such that ends of the two optical fibers 1 and 2 are arrayed in parallel with each other and are bonded to and fastened by a pair of fastening members 14 and 15. Likewise, the two optical fibers 3 and 4 are bundled by a fiber holder 13 such that ends of the two optical fibers 3 and 4 are arrayed in parallel with each other and are bonded to and fastened by a pair of fastening members 14 and 15. An end face 16 of each of the fiber holders 12 and 13 together with end faces of the bundled optical fibers is obliquely cut or polished so as to form an angle of about 8° with respect to the vertical plane.

In FIG. 1, reference numerals 40 through 48 denote optical paths along which light travels.

The optical passive component assembly of the above-described construction operates as follows.

In this embodiment, let it be assumed that light travels horizontally and the state of light within the grin rodlenses is indicated as loci of centers of light beams for brevity's sake. The polarized state of light is shown as being the direction of polarization indicated by arrows surrounded by circles, as normal planes of the light beams (planes generally normal to the drawings) is viewed from the left.

In FIG. 1, light 40 having a wavelength of 1.55 $\mu$m emitted from the optical fiber 1 enters the birefringent crystal 5 and is split into two linearly polarized light beams 41 and 42 having respective polarized light planes generally perpendicular to each other. These two linearly polarized light beams 41 and 42 enter the grin rodlens 7 having a numerical aperture greater than that of the optical fiber 1 at a location slightly away from the center thereof and are converted into two collimated rays at output ends thereof. The collimated rays then enter the magneto-optic crystal 8. Because the magneto-optic crystal 8 rotates a polarized light plane of incident light counterclockwise by 22.5° under the influence of a magnetic field produced by the cylindrical magnet 9, the polarized light planes of the two collimated rays 41 and 42 are both rotated counterclockwise by 22.5° and enter the optical filter 10.

The optical filter 10 is made up of a dielectric interference filter which reflects light having a wavelength of 1.55 $\mu$m and allows light having a wavelength of 1.48 $\mu$m to pass therethrough. Accordingly, the two linearly polarized light beams 41 and 42 are reflected by the optical filter 10 and enter the magneto-optic crystal 8 again. At this moment, the polarized light planes of the linearly polarized light beams 41 and 42 are further rotated 22.5° in the same direction as the previous rotation. As a result, the direction of polarization of the polarized light beams 43 and 44 which have passed the magneto-optic crystal 8 twice lies on a plane 45° shifted counterclockwise from that of the polarized light beams 41 and 42, respectively.

The two collimated and linearly polarized light beams 43 and 44 introduced into the grin rodlens 7 again are converged at the output end face thereof so as to be focused on two points in the proximity of the end face of the optical fiber 2. These two points are positioned generally symmetrically of the points of incidence of the polarized light beams 41 and 42 with respect to the optical axis of the grin rodlens 7. The polarized light beams 43 and 44 then enter the half-wave plate 6. The half-wave plate 6 rotates the polarized light planes of the polarized light beams 43 and 44 counterclockwise by 45°. Accordingly, when the linearly polarized light beams 43 and 44 are introduced into the birefringent crystal 5, the direction of polarization thereof lies on a plane 90° shifted counterclockwise from that of the polarized light beams 41 and 42, respectively. As shown in FIG. 1, because the birefringent crystal 5 has a function of coupling on the same optical path two linearly polarized light beams having respective polarized light planes generally perpendicular to each other, the two polarized light beams 43 and 44 are converted into a combined light beam 45, which in turn effectively enters the optical fiber 2.

On the other hand, a light beam emitted from the optical fiber 2 enters the birefringent crystal 5 and is split into two linearly polarized light beams, polarized light planes of which are subsequently rotated 45° clockwise by the half-wave plate 6. Because these light beams pass through the magneto-optic crystal 8 twice, the polarized light planes thereof are rotated 45° counterclockwise thereby. In this way, the light beam emitted from the optical fiber 2 travels along optical paths of the polarized light beams 41 and 42 in directions counter to the directions in which the light beams 41 and 42 travels. The directions of polarization of the light beams introduced into the birefringent crystal 5 twice differs about 90° from those of the polarized light beams 41 and 42, respectively. Because of this, even if such light beams enter the birefringent crystal 5, they are neither polarized nor coupled and are focused on respective specific positions different from the position of the optical fiber 1.

The above-described operation transmits the light from the optical fiber 1 towards the optical fiber 2 without causing any loss of light and intercepts light transmission in the reverse direction, and hence, the optical passive component of this type functions as an optical isolator.

Two linearly polarized light beams 46 and 47 each having a wavelength of 1.48 μm and having respective polarized light planes generally perpendicular to each other are emitted from the polarization-maintaining optical fibers 3 and 4 and enter the grin rodlens 11 at locations slightly away from the center thereof, respectively. These polarized light beams 46 and 47 are converted into generally collimated rays at the output end of the grin rodlens 11, respectively. The grin rodlens 11 has a numerical aperture greater than that of each of the optical fibers 3 and 4. The collimated and linearly polarized light beams 46 and 47 pass through the optical filter 10 and the magneto-optic crystal 8 in this order and enter the grin rodlens 7.

Within the grin rodlens 7, the polarized light beams 46 and 47 travel along the optical paths of the aforementioned polarized light beams 41 and 42 in directions counter to the directions in which the polarized light beams 41 and 42 travel, respectively. These light beams 46 and 47 are focused on the same optical path and are combined into a light beam 48 by the birefringent crystal 5, and thereafter, the combined light beam 48 effectively enters the optical fiber 1. The position of the optical fibers 3 and 4 and the direction of polarization of the polarized light beams 46 and 47 emitted therefrom are chosen such that after the polarized light planes of the light beams 46 and 47 have been rotated 22.5° counterclockwise by the magneto-optic crystal 8, the light beams 46 and 47 are combined by the birefringent crystal 5 and combined light enters the optical fiber 1.

The above-described operation polarizes and combines the linearly polarized light beams 46 and 47 each having a wavelength of 1.48 μm and emitted from the polarization-maintaining optical fibers 3 and 4, respectively. Because the light beams 46 and 47 are coupled in wavelength with the polarized light beams 41 and 42 having a wavelength of 1.55 μm, the optical passive component of this type functions as a polarized light coupler and an optical wavelength coupler.

Figure 3:
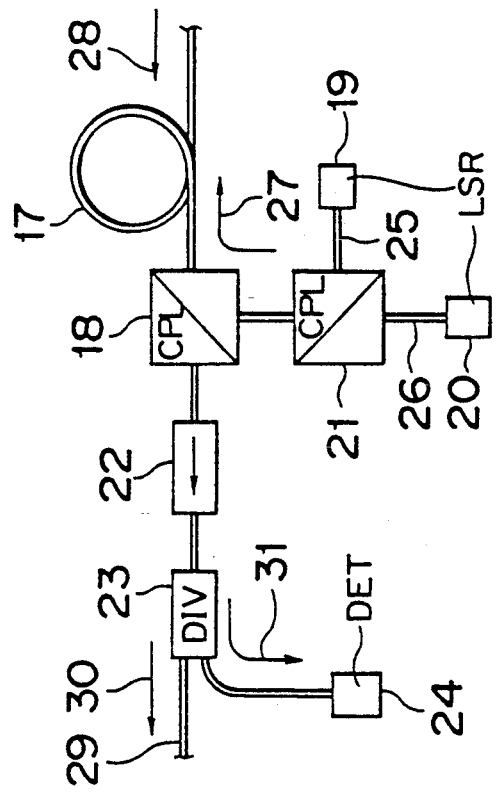
FIG. 3 is a schematic conventional optical fiber amplifier.

The construction of an optical fiber amplifier is discussed hereinafter. FIG. 3 schematically depicts a forward pumping optical fiber amplifier into which conventional optical passive components are integrated.

In FIG. 3, two optically pumping laser diodes (semiconductor lasers) 19 and 20 output pumping light beams each having a wavelength of 1.48 μm to polarization-maintaining optical fibers 25 and 26, respectively. The two light beams are then combined by a polarized light coupler 21, travel in a direction shown by an arrow 27 via an optical wavelength coupler 18, and enter an erbium-doped optical fiber 17. The optical wavelength coupler 18 combines light having a wavelength of 1.48 μm with that having a wavelength of 1.55 μm or separates the former from the latter.

The light having a wavelength of 1.48 μm, which has entered the erbium-doped optical fiber 17, is absorbed thereby and excites erbium atoms at a high energy level. When signal light 28 having a wavelength of 1.55 μm is introduced into the erbium-doped optical fiber 17, stimulated emission of light having the same wavelength occurs in proportion to the magnitude of the signal light 28. As a result, the signal light 28 is amplified along the erbium-doped optical fiber 17. The amplified signal light passes through the optical wavelength coupler 18, an optical isolator 22, and an optical splitter 23 in this order, and is emitted as signal light 29 from an optical fiber 29. An optical detector or light receiving element 24 detects part 31 of the amplified signal light split by the optical splitter 23 and monitors the magnitude thereof, thereby controlling an optical output derived from the laser diodes 19 and 20.

Returning back to FIG. 1, let it be assumed that the optical fiber 2 is placed at an output end of an optical isolator to which amplified signal light is to be introduced by coupling the optical fiber 1 with an optical fiber to which a rare earth element such as, for example, erbium is doped or added, and by coupling each of the polarization-maintaining optical fibers 3 and 4 with an optically pumping laser diode which outputs light having a wavelength of 1.48 μm. In this case, the optical passive component assembly shown in FIG. 1 can be employed in such a forward pumping optical fiber amplifier as discussed with reference to FIG. 3.

As described hereinabove, the first embodiment of the present invention is characterized in that, while the two grin rodlenses 7 and 11 are axially aligned with each other in end-to-end fashion, the two optical fibers 1 and 2 are placed so as to confront one end of the grin rodlens 7 remote from the grin rodlens 11, and the two polarization-maintaining optical fibers 3 and 4 are placed so as to confront one end of the grin rodlens 11 remote from the grin rodlens 7. The first embodiment of the present invention is also characterized in that the birefringent crystal 5 is interposed between the optical fibers 1 and 2 and the grin rodlens 7, and the half-wave plate 6, through which light emitted from the optical fiber 2 passes, is interposed between the birefringent crystal 5 and the grin rodlens 7. The first embodiment of the present invention is further characterized in that the magneto-optic crystal 8 is interposed between the two grin rodlenses 7 and 11, and the optical filter 10 is interposed between the magnet-optic crystal 8 and the grin rodlens 11.

By this construction, the optical passive component assembly shown in FIG. 1 achieves three optical passive functions of the polarized light coupler, the polarization-independent optical isolator, and the optical wavelength coupler, all of which constitute an optical fiber amplifier. As a result, the number of elements can be reduced to half of or less than that used in the conventional optical passive component assembly, and hence, a compact assembly can be manufactured at a low cost. Furthermore, the integration of the three optical passive functions reduces the number of connection between the optical fibers, thereby reducing the loss of insertion. Accordingly, the assembly shown in FIG. 1 contributes to miniaturization of the optical fiber amplifier and to enhancement in characteristics thereof.

In addition, because ends of the optical fibers 1 and 2 and those of polarization-maintaining optical fibers 3 and 4 are arrayed by the fiber holders 12 and 13, respectively, optical coupling can be readily carried out by appropriately adjusting the position of the fiber holder 12 relative to that of the grin rodlens 7 and the position of the fiber holder 13 relative to the grin rodlens 11, thereby facilitating the assembly operation. Also, because end faces of the fiber holders 12 and 13 opposed to the birefringent crystal 5 and the grin rodlens 11, respectively, are obliquely cut or polished so as to form an angle of about 8° with respect to the vertical plane, the amount of backward light reflected by the end faces can be considerably reduced.

In this embodiment, the optical isolator is employed as one of the optical passive components of the forward pumping optical fiber amplifier in order to allow the light 40 emitted from the optical fiber 1 to be introduced into the optical fiber 2. However, the direction of rotation of the polarized light plane by the magneto-optic crystal 8 may be reversed by reversing the polarity of the magnet 9 so that the optical isolator allows light to travel from the optical fiber 2 towards the optical fiber 1. This optical isolator can be employed in a backward pumping optical fiber amplifier.

Furthermore, although the polarized light plane of the transmitted light is rotated 22.5° counterclockwise by the magneto-optic crystal 8, the angle of rotation is not limited by this angle and may be a specific angle given by $\pi/8 + N\pi/4$ ($N = 0, 1, 2, 3, \ldots$).

In this embodiment, two fiber holders 12 and 13 are used, both of them are not always required.

Moreover, in this embodiment, although explanation has been omitted with resect to the space between two adjoining optical devices through which light passes, this space may be an air layer or may be filled with a transparent material such as, for example, a refractive-index matching material. Alteratively, the two adjoining optical devices may be coupled with each other via an anti-reflection coating or the like.

Figure 4:
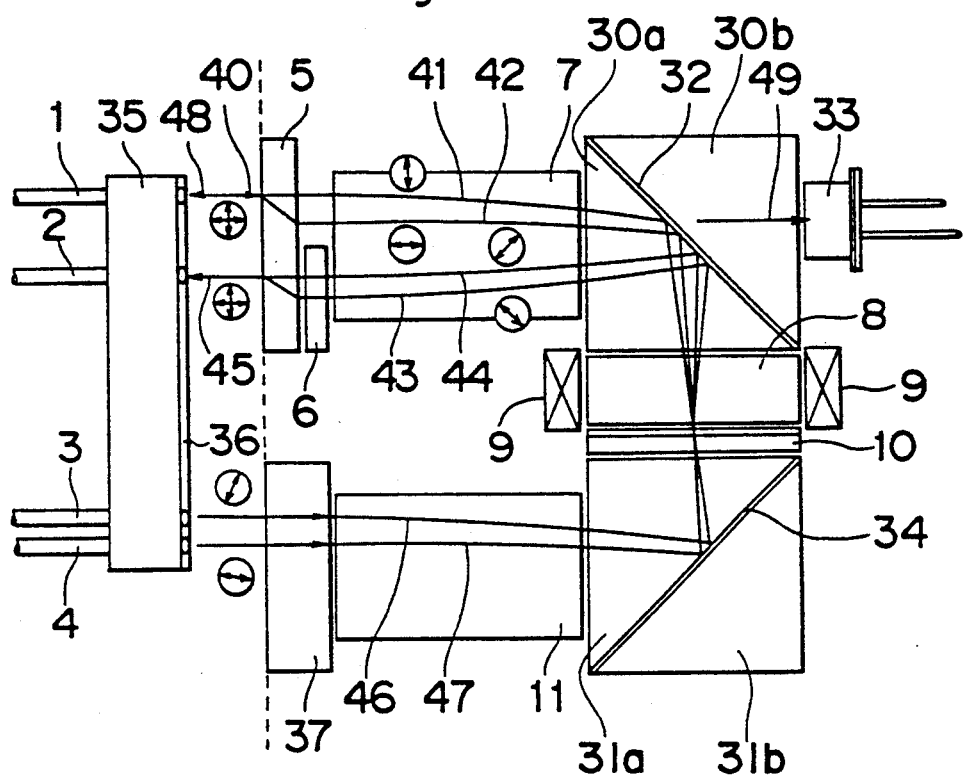
FIG. 4 is a view similar to FIG. 1, but indicating a second embodiment of the present invention.

FIG. 4 schematically depicts an optical passive component assembly according to a second embodiment of the present invention.

As shown in FIG. 4, two single-mode optical fibers 1 and 2 and two polarization-maintaining optical fibers 3 and 4 are bundled by a single fiber holder 35 such that ends of the bundled optical fibers 1 through 4 are arrayed in parallel with one another and are bonded to and fastened by a pair of opposed fastening members, as is the case with the first embodiment. The two optical fibers 3 and 4 are located remote from the two optical fibers 1 and 2. The fiber holder 35 has one end face 36 opposed to a birefringent crystal 5 and a transparent member 37. The end face 36 of the fiber holder 35 is obliquely cut or polished so as to form an angle of about 8° with respect to the vertical plane.

The birefringent crystal 5 is axially aligned with a first grin rodlens 7 with a half-wave plate 6 interposed therebetween. The half-wave plate 6 is off-centered from the birefringent crystal 5 and the first grin rodlens 7. The right end face of the first grin rodlens 7 is opposed to a first side of a triangular prism 30a of which a second side generally perpendicular to the first side is opposed to one end face of a magneto-optic crystal 8. A half mirror 32 is sandwiched between a slant surface of the triangular prism 30a and that of a triangular prism 30b. The half mirror 32 reflects most of incident light and bends the optical axis by about 90°, and allows part of the incident light to pass therethrough. Light 49, which has passed through the half mirror 32, is detected by a photodiode 33 opposed to the triangular prism 30b.

The other end face of the magneto-optic crystal 8 is opposed to a first side of a triangular prism 31a of which a second side generally perpendicular to the first side is opposed to a second grin rodlens 11. As is the case with the half mirror 32, a reflector 34 is sandwiched between a slant surface of the triangular prism 31a and that of a triangular prism 31b. The reflector 34 reflects incident light and bends the optical axis by about 90°. The magneto-optic crystal 8 is encircled by a cylindrical magnet 9, and an optical filter 10 is interposed between the magneto-optic crystal 8 and the triangular prism 31a.

The second grin rodlens 11 and the transparent member 37 are axially aligned with each other, and the direction of alignment of these two optical devices 11 and 37 is parallel to that of the birefringent crystal 5 and the first grin rodlens 7. The transparent member 37 is made of a glass block or the like to allow light to pass therethrough without any loss. The transparent member 37 has approximately the same thickness as the total thickness of the birefringent crystal 5 and the half-wave plate 6.

The optical passive component assembly of the above-described construction operates as follows.

The second embodiment shown in FIG. 4 differs from the first embodiment shown in FIG. 1 in that, in the second embodiment, linearly polarized light beams 41 and 42 emitted from the optical fiber 1 and polarized and separately by the birefringent crystal 5 are directed towards the half mirror 32, and part of them i.e., the light 49 passes therethrough and is received by the photodiode 33. Accordingly, the second embodiment provides an optical splitter for branching part of light 40 which is to be transmitted from the optical fiber 1 to the optical fiber 2 and a light receiving element for monitoring the branched light 49.

Furthermore, according to the second embodiment, the provision of the half mirror 32 and the reflector 34 bends an optical path in the form of a figure "U" and enables the two optical fibers 1 and 2 and the two polarization-maintaining optical fibers 3 and 4 to be disposed on the same side of the optical passive component assembly.

In applications where the optical fiber 1 is coupled with an optical fiber to which a rate earth element such as, for example, erbium is added or doped, and each of the optical fibers 3 and 4 is coupled with an optically pumping laser diode which outputs light having a wavelength of 1.48 μm, when the optical fiber 2 is so chosen as to be an output fiber for outputting an optical signal described from light having a wavelength of 1.55 μm, the optical passive component assembly shown in FIG. 4 functions as a polarization-independent optical isolator, a polarized light coupler, an optical wavelength coupler, an optical splitter, and a light receiving and monitoring element, all of which are referable employed in the forward pumping optical fiber amplifier as discussed with reference to FIG. 3.

Because these five optical passive functions are integrally incorporated in the assembly shown in FIG. 4 using a reduced number of optical devices, the size of the assembly can be made small and the loss of insertion can be reduced.

In this embodiment, the half mirror 32 and the reflector 34 are so disposed as to form an angle of about 45° with respect to the optical axis, and the four optical fibers 1 through 4 to be couples optically with associated optical devices are disposed on the same side of the assembly so that respective optical axes may be parallel to one another. Accordingly, the area required for installing the optical fibers can be reduced, thus contributing to miniaturization of the optical fiber amplifiers.

Furthermore, because one end surface of the birefringent crystal 5 and that of the transparent member 37 are aligned with each other as shown by a dotted line in FIG. 4, ends of the four optical fibers 1 through 4 arrayed by the fiber holder 35 are spaced a given length away therefrom. Accordingly, in assembling the optical passive components, all of the optical fibers 1 through 4 are optically coupled with the associated optical devices at the same time. Also, the ends of the four optical fibers 1 through 4 can be obliquely cut off simultaneously by obliquely cutting the end surface 36 of the fiber holder 35, thereby not only eliminating return of reflected light on the end surfaces, but also reducing the period of time required for fabricating the optical passive components.

In this embodiment, although the polarization-independent optical isolator is provided as one of the optical passive components constituting a forward pumping optical fiber amplifier, a backward pumping optical fiber amplifier can be constituted by reversing the polarity of the cylindrical magnet 9, as is the case with the first embodiment. Furthermore, although the magneto-optic crystal 8 and the optical filter 10 are interposed between the half mirror 32 and the reflector 34, the magneto-optic crystal 8 may be disposed between the first grin rodlens 7 and the half mirror 32, whereas the optical filter 10 may be disposed between the reflector 34 and the second grin rodlens 11.

In this embodiment, although the light 49 which has passed through the half mirror 32 is directly received by the photodiode 33, the former may be detected by the latter via a lens. Furthermore, the fiber holder 35 may be replaced by two fiber holders spaced from each other for holding the two optical fibers 1 and 2 and the two optical fibers 3 and 4, respectively.

In addition, although each of the half mirror 32 and the reflector 34 is disposed on the slant surface of a triangular prism, the use of the triangular prism is not always required. Also, reflection by the reflector 34 may be replaced by total internal reflection caused by the slant surface of the triangular prism. Furthermore, the half mirror 32 and the reflector 34 may be placed so as to form an angle other than 45° with respect to the optical axis.

Figure 5:
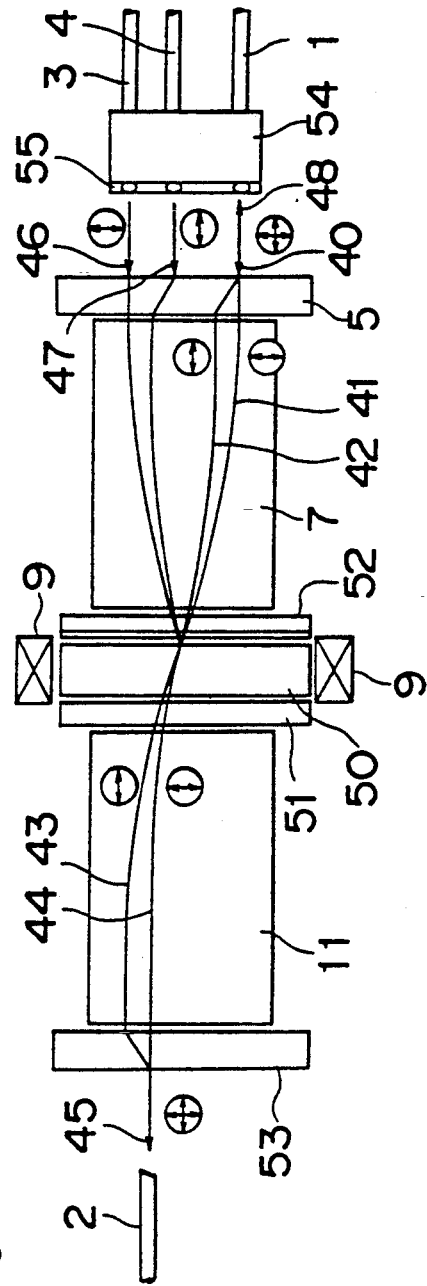
FIG. 5 is a view similar to FIG. 1, but indicating a third embodiment of the present invention.

FIG. 5 schematically depicts an optical passive component assembly according to a third embodiment of the present invention. The assembly shown in FIG. 5 includes a birefringent crystal 5, a first grin rodlens 7, an optical filter 52, a magneto-optic crystal 50, a half-wave plate 51, a second grin rodlens 11, and a birefringent crystal 53, all of which are axially aligned in this order from the right to the left.

The magneto-optic crystal 50 is encircled by a cylindrical magnet 9 and nonreversibly rotates a polarized light plane of incident light counterclockwise by 45° under the influence of a magnetic field produced by the magnet 9. The half-wave plate 51 is made of a rotational crystal for reversibly rotating a polarized light plane of incident light by 45°. The optical filter 52 reflects light having a wavelength of 1.48 μm and allows light having a wavelength of 1.55 μm to pass therethrough. The birefringent crystal 53 is made of, for example, a rutile crystal for combining on the same optical path two linearly polarized light beams having respective polarized light planes generally perpendicular to each other. The direction of the optical axis of the birefringent crystal 53 and that of the optical axis of the birefringent crystal 5 is in reversed relationship. A single-mode optical fiber 1 and two polarization-maintaining optical fibers 3 and 4 are bundled by a fiber holder 54 such that ends of the bundled optical fibers 1, 3, and 4 arrayed in parallel with one another and are bonded to the fiber holder 54. An end face 55 of the fiber holder 54 together with end faces of the optical fibers 1, 3, and 4 is obliquely cut or polished so as to form an angle of about 8° with respect to the vertical plane.

The optical passive component assembly of the above-described construction operates as follows.

Light 40 having a wavelength of 1.55 μm emitted from the optical fiber 1 initially enters the birefringent crystal 5 and is split into two linearly polarized light beams 41 and 42 having respective polarized light planes generally perpendicular to each other. These two linearly polarized light beams 41 and 42 enter the grin rodlens 7 at a location slightly away from the center thereof and are converted into two collimated rays at an output end thereof. The collimated rays then enter the optical filter 52 including a dielectric interference filter, which allows light having a wavelength of 1.55 μm to pass therethrough and reflects light having a wavelength of 1.48 μm. Accordingly, the collimated and linearly polarized light beams 41 and 42 pass through the optical filter 52 and enter the magneto-optic crystal 50.

The polarized light planes of the light beams 41 and 42 introduced into the magneto-optic crystal 50 are rotated 45° counterclockwise and are further rotated 45° by the half-wave plate 51 in the same direction. As a result, the direction of polarization of polarized light beams 43 and 44 introduced into the second grin rodlens 11 via the half-wave plate 51 differs 90° from that of the polarized light beams 41 and 42, respectively.

The two light beams 43 and 44 are so converged as to be focused on an output end face of the second grin rodlens 11 at two point slightly away from the center thereof and subsequently enter the birefringent crystal 53. Because the birefringent crystal 53 is placed such that the direction of the optical axis thereof is in reversed relationship with that of the optical axis of the birefringent crystal 5, the light beams 43 and 44 having respective polarized light planes generally perpendicular to each other are focused on the same optical path and are combined into a single light beam 45, which is in turn effectively introduced into the optical fiber 2. Although light emitted from the optical fiber 2 is not allowed to enter the optical fiber 1, explanation regarding interception of this light is omitted.

This operation corresponds to the function of a polarization-independent optical isolator required to allow the light 40 emitted from the optical fiber 1 to enter the optical fiber 2.

On the other hand, two linearly polarized light beams 46 and 47 each having a wavelength of 1.48 μm and having respective polarized light planes generally perpendicular to each other are emitted from the polarization-maintaining optical fibers 3 and 4 pass through the birefringent crystal 5 and enter the first grin rodlens 7 at locations generally symmetrically of the locations where the light beams 41 and 42 from the optical fiber 1 enter. These light beams 46 and 47 are converted into generally collimated rays at the output end of the first grin rodlens 7, respectively. The collimated and linearly polarized light beams 46 and 47 are then reflected by the optical filter 52 and pass through the first grin rodlens 7 in the reverse direction along the same optical paths as the optical paths 41 and 42. The light beams 46 and 47 are subsequently converged and converted into combined light 48 by the birefringent crystal 5, and the combined light 48 is in turn introduced into the optical fiber 1. The optical paths of the linearly polarized light beams 46 and 47 emitted from the optical fibers 3 and 4 are vertically replaced before and after the reflection by the optical filter 52, and the two light beams 46 and 47 are polarized and combined with each other after they have passed through the birefringent crystal 5 twice.

Because two light beams each having a wavelength of 1.48 μ emitted from the optical fibers 3 and 4, respectively, are polarized and combined, and are coupled with light 40 having a wavelength of 1.55 μm, the above operation corresponds to the function of a polarized light coupler and that of an optical wavelength coupler.

In applications where the optical fiber 1 is coupled with an optical fiber to which a rare earth element such as, for example, erbium is added or doped, and each of the optical fibers 3 and 4 is coupled with an optically pumping laser diode which outputs light having a wavelength of 1.48 μm, when the optical fiber 2 is so chosen as to be an output fiber for outputting an amplified optical signal, the assembly shown in FIG. 5 can be preferably employed in the forward pumping optical fiber amplifier as discussed with reference to FIG. 3.

Because five optical passive functions required for the optical fiber amplifier are integrally incorporated in the assembly shown in FIG. 5 using a reduced number of optical devices, the assembly can be made small at a reduced cost. Furthermore, the integration of the five optical passive functions reduces the number of connection between the optical fibers, thereby reducing the loss of insertion. As a result, this embodiment also contributes to miniaturization of the optical fiber amplifier and to enhancement in characteristics thereof.

Furthermore, because ends of the optical fibers 1, 3, and 4 are bundled and arrayed by the fiber holder 54, optical coupling between these optical fibers 1, 3, and 4 and the birefringent crystal 5 can be readily carried out merely by appropriately adjusting the relative position thereof, thereby facilitating the assembling. Also, because the end face 55 of the fiber holder 54 and an end face of the optical fiber 2 are obliquely cut off at an angle of about 8°, undesired return of reflected light can be reduced at the end faces of the optical fibers.

In this embodiment, although the optical isolator, which only allows the light 40 emitted from the optical fiber 1 to be introduced into the optical fiber 2, is provided as part of the optical passive components constituting a forward pumping optical fiber amplifier, this optical isolator can also be employed in a backward pumping optical fiber amplifier so as to allow light emitted from the optical fiber 2 to be introduced into the optical fiber 1, for example, by reversing the polarity of the cylindrical magnet 9 so that the polarized light plane of the magneto-optic crystal 50 may be rotated clockwise.

Furthermore, in this embodiment, although the polarized light plane of the transmitted light is rotated 45° counterclockwise by the magneto-optic crystal 50, the angle of rotation is not limited by this angle and may be a specific angle given by $\pi/4 + N\pi/2$ ($N=0,1,2,3,\ldots$).

Figure 6:
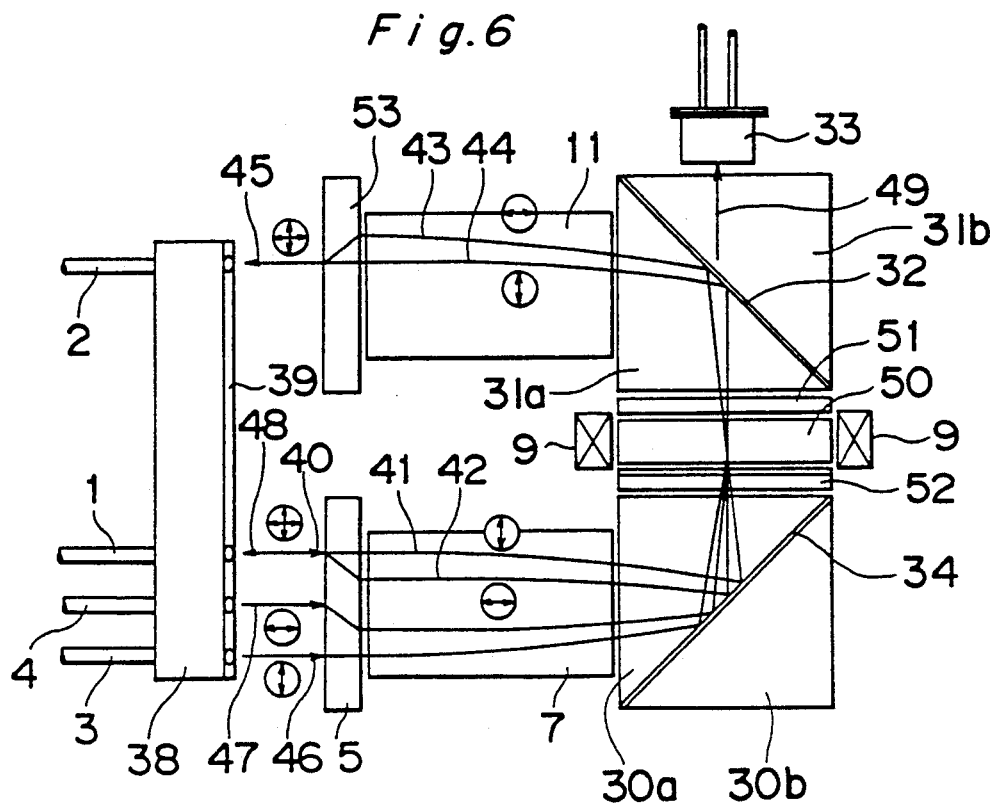
FIG. 6 is a view similar to FIG. 1, but indicating a fourth embodiment of the present invention.

FIG. 6 schematically depicts an optical passive component assembly according to a fourth embodiment of the present invention.

As shown in FIG. 6, a single-mode optical fiber 2 and a group of a single-mode optical fiber 1 and two polarization-maintaining optical fibers 3 and 4 are bundled by a fiber holder 38 such that ends of the bundled optical fibers 1 through 4 are arrayed in parallel with one another. The group of optical fibers 1, 3, and 4 are located remote from the optical fiber 2. The fiber holder 38 has one end face 39 opposed to two birefringent crystals 5 and 53. The end face 39 of the fiber holder 38 is obliquely cut or polished so as to form an angle of about 8° with respect to the vertical plane.

The birefringent crystal 5 is axially aligned with a first grin rodlens 7, whereas the birefringent crystal 53 is axially aligned with a second grin rodlens 11 in a direction parallel to the direction of alignment of the birefringent crystal 5 and the first grin rodlens 7. The right end face of the first grin rodlens 7 is opposed to a first side of a triangular prism 30a of which a second side generally perpendicular to the first side is opposed to an optical filter 52. A reflector 34 is sandwiched between a slant surface of the triangular prism 30a and that of a triangular prism 30b. Likewise, the right end face of the second grin rodlens 11 is opposed to a first side of a triangular prism 31a of which a second side generally perpendicular to the first side is opposed to a half-wave plate 51. As is the case with the reflector 34, a half mirror 32 is sandwiched between a slant surface of the triangular prism 31a and that of a triangular prism 31b.

The half-wave plate 51 and the optical filter 52 are axially aligned with each other with a magneto-optic crystal 50 interposed therebetween. The magneto-optic crystal 50 is encircled by a cylindrical magnet 9. A photodiode 33 is opposed to the triangular prism 31b and is aligned with the half-wave plate 51, the magneto-optic crystal 50, and the like.

The assembly shown in FIG. 6 of the above-described construction operates substantially in the same fashion as that shown in FIG. 5. The former differs from the latter in that the former is provided with the half mirror 32, interposed between the half-wave plate 51 and the second grin rodlens 11, for transmitting part of incident light therethrough and a photodiode 33 for detecting the transmitted light. The half mirror 32 and the photodiode 33 act an optical splitter for branching light 49 from light 40 having a wavelength of 1.55 μm and travelling from the optical fiber 1 towards the optical fiber 2 and a light receiving and monitoring element for detecting the branched light 49, respectively.

Furthermore, the assembly shown in FIG. 6 is characterized in that the optical axis is bent in the form of a figure "U" by the reflector 34, interposed between the first grin rodlens 7 and the optical filter 52, for reflecting incident light to bend the optical axis by about 90°, and by the half mirror 32 for reflecting most of incident light to bend the optical axis by about 90°. This arrangement enables all of the optical fibers 1 through 4 to be placed on the same side of the assembly.

As is the case with the embodiment shown in FIG. 5, the construction shown in and described with reference to FIG. 6 greatly contributes to realization of a compact optical passive component assembly exhibiting a minimized loss of insertion, in which an optical isolator, a polarized light coupler, an optical wavelength coupler, an optical splitter, and a light receiving and monitoring element, all required for a forward pumping optical fiber amplifier, are integrated.

Also, as is the case with the embodiment of FIG. 4, the arrangement in which the optical fibers 1 through 4 adapted to be coupled with the optical passive components are disposed on the same side and are arrayed in parallel with one another facilitates the assembling of the optical passive components. Furthermore, the area required for installing the optical fibers can be reduced, thus contributing to realization of a compact optical amplifier.

In this embodiment, although the half-wave plate 51, the magneto-optic crystal 50, and the optical filter 52 are disposed between the half mirror 32 and the reflector 34, the optical filter 52 may be placed between the first grin rodlens 7 and the reflector 34, and the magneto-optic crystal 50 and the half-wave plate 51 may be placed anywhere between the first grin rodlens 7 and the second grin rodlens 11.

Also, in this embodiment, although the four optical fibers 1 through 4 are bundled by the fiber holder 38, the optical fiber 2 and the group of optical fibers 1, 3, and 4 may be separated from each other and fastened by two fiber holders, respectively. Furthermore, the half mirror 32 and the reflector 34 may be placed so as to form an angle other than 45° with respect to the optical axis.

In addition, in the first through fourth embodiments discussed above, although two grin rodlenses 7 and 11 are employed in the assembly, aspherical lenses or any other suitable lenses can be also employed if each of them has a numerical aperture greater than that of each optical fiber, and if an aberration thereof at a location away from the center axis is restrained.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An optical passive component assembly comprising:

a first fiber group having first and second optical fibers;

a birefringent crystal, opposed to end faces of said first and second optical fibers, for separating incident light into two linearly polarized light beams having respective polarized light planes generally perpendicular to each other;

a half-wave plate for allowing light emitted from said second optical fiber to pass therethrough and for rotating a polarized light plane of incident light;

a first lens for converting incident light into a generally collimated ray;

a magneto-optic crystal for rotating a polarized light plane of incident light by an angle of $\pi/8+N\pi/4$ (N=0, 1, 2, . . .) under an influence of a magnetic field;

an optical filter for reflecting light having a specific wavelength and for allowing light having a wavelength other than said specific wavelength to pass therethrough;

a second lens for converging a collimated ray introduced thereinto;

a second fiber group having third and fourth optical fibers, end faces of which are opposed to said second lens; and said birefringent crystal, said half-wave plate, said first lens, said magneto-optic crystal, said optical filter, said second lens being disposed in this order, whereby an optical coupling system is constituted between said first and second optical fibers and between said third and fourth optical fibers and one of said first and second optical fibers.

2. The optical passive component assembly according to claim 1, wherein said first lens comprises a convergent rodlens having a numerical aperture greater than that of said first optical fiber and that of said second optical fiber, and said second lens comprises a convergent rodlens having a numerical aperture greater than that of said third optical fiber and that of said fourth optical fiber.

3. The optical passive component assembly according to claim 1, further comprising a fiber holder for holding one of said first and second fiber groups, said fiber holder aligning ends of optical fibers of said one of said first and second fiber groups, wherein an end face of said fiber holder together with the end faces of optical fibers held by said fiber holder is obliquely cut.

4. The optical passive component assembly according to claim 1, wherein each of said third and fourth optical fibers comprises a polarization-maintaining optical fiber in which a polarized light plane is maintained unchanged.

5. The optical passive component assembly according to claim 1, further comprising a half mirror interposed between said first lens and said optical filter, a reflector interposed between said half mirror and said second lens, and a photodiode disposed in the proximity of said half mirror, said half mirror reflecting most of incident light, thereby bending an optical axis, said half mirror allowing part of said incident light directed thereto to pass therethrough, said reflector reflecting incident light, thereby further bending said optical axis, said photodiode detecting an amount of said part of said incident light which has passed through said half mirror.

6. The optical passive component assembly according to claim 5, wherein said half mirror and said reflector are inclined about 45° with respect to said optical axis, and said first through fourth optical fibers are disposed on a same side of said optical passive component assembly.

7. The optical passive component assembly according to claim 6, further comprising a fiber holder for holding said first through fourth optical fibers, said fiber holder aligning ends of said first through fourth optical fibers, wherein an end face of said fiber holder together with end faces of said first through fourth optical fibers is obliquely cut.

8. An optical fiber amplifier comprising:
 a first fiber group having first and second optical fibers;
 a birefringent crystal, opposed to end faces of said first and second optical fibers, for separating incident light into two linearly polarized light beams having respective polarized light planes generally perpendicular to each other;
 a half-wave plate for allowing light emitted from said second optical fiber to pass therethrough and for rotating a polarized light plane of incident light;
 a first lens for converting incident light into a generally collimated ray;
 a magneto-optic crystal for rotating a polarized light plane of incident light by an angle of $\pi/8 + N\pi/4$ ($N = 0, 1, 2, \ldots$) under an influence of a magnetic field;
 an optical filter for reflecting light having a specific wavelength and for allowing light having a wavelength other than said specific wavelength to pass therethrough;
 a second lens for converging a collimated ray introduced thereinto;
 a second fiber group having third and fourth optical fibers, end faces of which are opposed to said second lens;
 two optically pumping laser diodes connected to said third and fourth optical fibers, respectively; and
 said birefringent crystal, said half-wave plate, said first lens, said magneto-optic crystal, said optical filter, and said second lens being disposed in this order,
 whereby an optical coupling system is constituted between said first and second optical fibers and between said third and fourth optical fibers and one of said first and second optical fibers.

9. An optical passive component assembly comprising:
 a fiber group having first, third and fourth optical fibers;
 a first birefringent crystal, opposed to end faces of said first, third and fourth optical fibers, for separating incident light into two linearly polarized light beams having respective polarized light planes generally perpendicular to each other;
 a first lens for converting incident light into a generally collimated ray;
 an optical filter for reflecting light having a specific wavelength and for allowing light having a wavelength other than said specific wavelength to pass therethrough;
 a magneto-optic crystal for rotating a polarized light plane of incident light by an angle of $\pi/4 + N\pi/2$ ($N = 0, 1, 2, \ldots$) under an influence of a magnetic field;
 a half-wave plate for rotating a polarized light plane of incident light;
 a second lens for converging a collimated ray introduced thereinto;
 a second birefringent crystal for combining two linearly polarized light beams on a same optical path;
 a second optical fiber having an end face opposed to said second birefringent crystal; and
 said first birefringent crystal, said first lens, said optical filter, said magneto-optic crystal, said half-wave plate, said second lens, and said second birefringent crystal being disposed in this order,
 whereby an optical coupling system is constituted between said first optical fiber and said second optical fiber and between said first optical fiber and said third and fourth optical fibers.

10. The optical passive component assembly according to claim 9, wherein said first lens comprises a convergent rodlens having a numerical aperture greater than that of each of said first, third, and fourth optical fibers, and said second lens comprises a convergent rodlens having a numerical aperture greater than that of said second optical fiber.

11. The optical passive component assembly according to claim 9, further comprising a fiber holder for holding said fiber group and for aligning ends of said first, third, and fourth optical fibers, wherein an end face of said fiber holder together with the end faces of said first, third, and fourth optical fibers is obliquely cut.

12. The optical passive component assembly according to claim 9, wherein each of said third and fourth optical fibers comprises a polarization-maintaining optical fiber in which a polarized light plane is maintained unchanged.

13. The optical passive component assembly according to claim 9, further comprising a half mirror interposed between said second lens and said optical filter, a reflector interposed between said half mirror and said first lens, and a photodiode disposed in the proximity of said half mirror, said half mirror reflecting most of incident light, thereby bending an optical axis, said half mirror allowing part of said incident light directed thereto to pass therethrough, said reflector reflecting incident light, thereby further bending said optical axis, said photodiode detecting an amount of said part of said incident light which has passed through said half mirror.

14. The optical passive component assembly according to claim 13, wherein said half mirror and said reflector are inclined about 45° with respect to said optical axis, and said first through fourth optical fibers are disposed on a same side of said optical passive component assembly.

15. The optical passive component assembly according to claim 14, further comprising a fiber holder for holding said first through fourth optical fibers, said fiber holder aligning ends of said first through fourth optical fibers, wherein an end face of said fiber holder together with end faces of said first through fourth optical fibers is obliquely cut.

16. An optical fiber amplifier comprising:
 a fiber group having first, third and fourth optical fibers;
 a first birefringent crystal, opposed to end faces of said first, third and fourth optical fibers, for separating incident light into two linearly polarized light beams having respective polarized light planes generally perpendicular to each other;
 a first lens for converting incident light into a generally collimated ray;

an optical filter for reflecting light having a specific wavelength and for allowing light having a wavelength other than said specific wavelength to pass therethrough;

a magneto-optic crystal for rotating a polarized light plane of incident light by an angle of $\pi/4+N\pi/2$ (N=0, 1, 2, ...) under an influence of a magnetic field;

a half-wave plate for rotating a polarized light plane of incident light;

a second lens for converging a collimated ray introduced thereinto;

a second birefringent crystal for combining two linearly polarized light beams on a same optical path;

a second optical fiber having an end face opposed to said second birefringent crystal;

two optically pumping laser diodes connected to said third and fourth optical fibers, respectively; and said first birefringent crystal, said first lens, said optical filter, said magneto-optic crystal, said half-wave plate, said second lens, and said second birefringent crystal being disposed in this order, whereby an optical coupling system is constituted between said first optical fiber and said second optical fiber and between said first optical fiber and said third and fourth optical fibers.

* * * * *